Feb. 12, 1963   M. F. MURRAY   3,077,046
ILLUMINABLE FISH LURE
Filed April 4, 1961
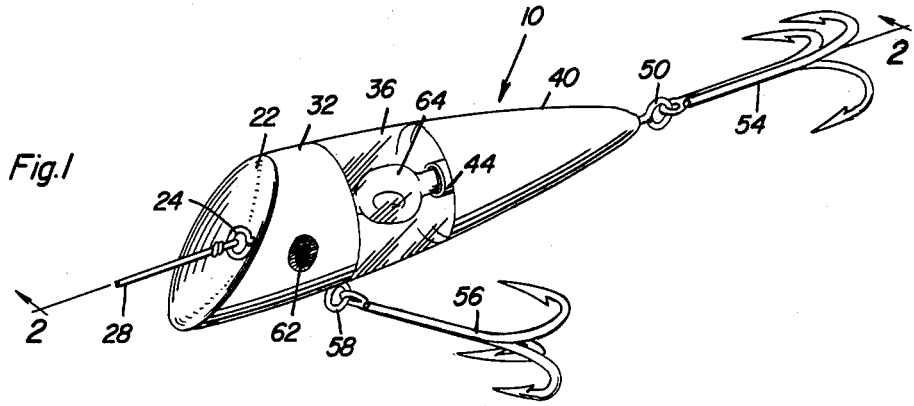
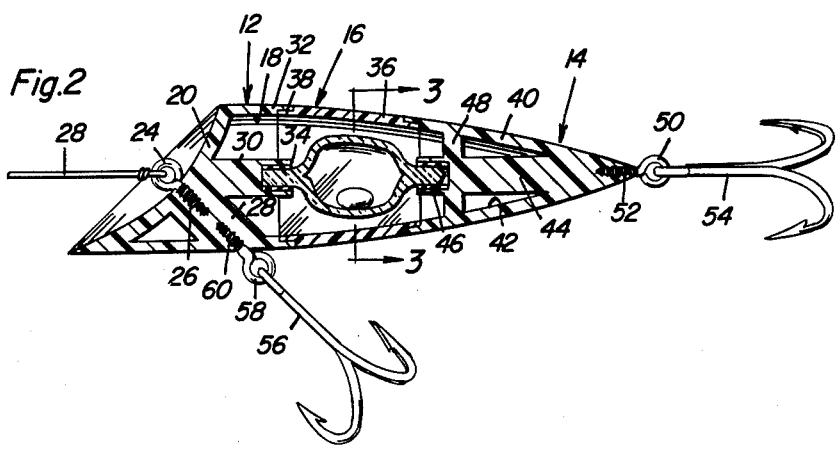
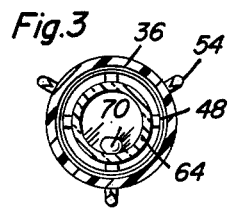
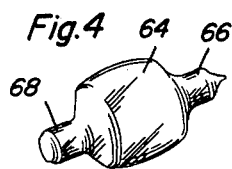
Michael F. Murray
INVENTOR.

United States Patent Office 3,077,046
Patented Feb. 12, 1963

3,077,046
ILLUMINABLE FISH LURE
Michael F. Murray, 381 Park Ave., Eugene, Oreg.
Filed Apr. 4, 1961, Ser. No. 100,654
1 Claim. (Cl. 43—17.6)

The present invention generally relates to a fish lure and more particularly a fish lure having a novel means for illuminating a portion thereof which illuminating feature is activated by the motion of the fish lure itself and does not require the use of any extraneous power source such as a dry cell flashlight battery or the like which is normally employed in illuminated fish lures.

Another object of the present invention is to provide an illuminated fish lure having a novel structural arrangement which enables the illumination feature to be most effectively employed and also which enables the use of a plurality of gang hooks or the like and further which produces motion during relative movement between water and the fish lure body.

Another important feature of the present invention is to provide an illuminable fish lure having an illumination feature which requires no replacement of parts, renewal of batteries or the like and which will produce a luminescent red glow when agitated.

Still another important feature of the present invention is to provide an illuminable fish lure which is quite simple in construction, effective in use and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspeitive view of the illuminable fish lure of the present invention;

FIGURE 2 is a longitudinal, vertical sectional view taken substantially upon a plane passing along section line 2—2 of FIGURE 1 illustrating further structural details of the fish lure;

FIGURE 3 is a transverse, sectional view taken substantially upon a plane passing along section line 3—3 of FIGURE 2 illustrating the relationship of the structural features of the invention; and FIGURE 4 is a perspective view of the transparent bubble which produces a luminescent red glow when agitated.

Referring now specifically to the drawings, the numeral 10 generally designates a fish lure embodying the principles of the present invention therein which includes a front section generally designated by the numeral 12, a rear section generally designated by the numeral 14 and a center section generally designated by the numeral 16. The sections of the body are connected together to form a smoothly tapering body having a larger front end and a smaller rear end.

The front section 12 is hollow as indicated by numeral 18 and provided with a front wall 20 having a concave curvature 22. The front wall 20 is inclined upwardly and rearwardly and the concavity 22 is likewise inclined as clearly illustrated in FIGURE 2.

Generally at the center of the front wall 20, an eye member 24 is attached by virtue of a screw-threaded shank 26 extending into a reinforcing web 28 which extends rearwardly and downwardly from the front wall 20 to the bottom of the front section 12. A fish line or leader 28 is attached to the eye member 24 in the usual manner.

Centrally disposed on the front wall 20 and extending longitudinally of the front section 12 is a mounting stud 30 terminating flush with the rear edge of the main body portion 32 of the front section 12. The terminal rear end of the stud 30 is provided with a socket 34 extending longitudinally thereinto.

The central body section 16 is in the form of a hollow plastic shell 36 of transparent construction having a circular cross sectional configuration and tapering from the front to the rear thereof. The front section 12 is also of plastic material as is the rear section 14 and the central body 36 is provided with recessed ends 38 telescopically engaged with and bonded to the front and rear sections respectively.

The rear section 14 includes a tapering body 40 of plastic material having a hollow interior 42 and a longitudinally extending mounting stud 44 terminating at its forward end generally flush with the line of junction between the central section and the rear section. The stud 44 is provided with a socket 46 in the end thereof and the stud 44 is reinforced by radial members 48 extending to the peripheral wall of the rear section 14.

In the tip rear end of the tapereing body 40, an eye member 50 is mounted. The eye member 50 is supported by virtue of a threaded shank 52 threaded into the tip end of the body 40 and a gang hook or any other suitable hook assembly 54 is supported on the eye member 50 in the usual manner.

The bottom or ventral portion of the lure 10 is provided with another gang hook 56 of any suitable configuration and this gang hook is supported from an eye member 58 supported by virtue of a threaded shank 60 extending inwardly and inclined towards the front of the front section 12 and being inserted into the reinforcement 28 in general opposition to the threaded shank 26.

Thus, with the present construction, all attachments are made at solid portions of the body and yet the body is sufficiently hollow to be relatively light in weight and is conveniently constructed of plastic material. The front and rear sections 12 and 14 may be conveniently of opaque plastic material such as a highly attractive color such as red or the like and the exterior surface of the body may be provided with ornamental elements such as a simulated eye 62 and the like to more nearly simulate a small fish so that it will be more effective as a fish lure.

Disposed concentrically in spaced relation to the central hollow body 36 is a glass transparent bulb or bubble 64 having axially extending ends 66 and 68 which are sealed. The ends 66 and 68 are received in the sockets 46 and 34 respectively and are rigidly secured thereto by a suitable bonding material such as a waterproof adhesive or the like. Thus, when the device is assembled, the glass bulb 64 is spaced from the transparent member 36 generally in concentric relation and the glass bulb 64 is transparent as is the central body 36 for observing the interior of the glass bulb which produces a luminous red glow when agitated. Thus, as the fish lure is agitated during normal movement thereof, the glass bubble 64 will produce a luminescent red glow which can be observed through the clear plastic window formed by the body 36.

The illuminating means does not produce any heat and includes a quantity of mercury 70 and rare neon gas which produce a luminescent red glow when agitated.

In actual practice, the glass bulb is constructed of "Pyrex" glass and the liquid mercury occupies approximately one-fourth of the volume of the bulb with the bulb having all air evacuated therefrom and filled with rare inert neon gas. The hollow area enclosed by the body sections is sufficient to cause the device to serve as a float either on top of the water or at a predetermined depth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A fish lure comprising an elongated tapering body having a larger front end and a smaller rear end, a hook assembly supported from the body along the bottom portion thereof, another hook assembly supported from the body adjacent the rear thereof, the larger front end of said body having a concave inclined surface, means attaching a fishing line to the concave surface generally at the center thereof, said body including a front section, a central section and a rear section bonded together, said central section including an annular transparent member, said front and rear sections each having hollow portions and an inwardly extending stud, each stud having a socket in the inner end thereof, said sockets opening toward the central section and disposed in concentric relation to the transparent member, glow producing means mounted in said central section and including a transparent hollow glass bulb of less diameter than the transparent member and having projecting end portions of reduced cross sectional area at each end thereof, a quantity of liquid mercury within the bulb, neon gas filling the volume of the bulb and cooperating with the liquid mercury to produce a glow when agitated, said reduced end portions of the bulb being received in said sockets thereby mounting the bulb in spaced concentric relation to the transparent member.

References Cited in the file of this patent

UNITED STATES PATENTS

| | | |
|---|---|---|
| 2,112,385 | Smith | Mar. 29, 1938 |
| 2,449,880 | Cox | Sept. 21, 1948 |

OTHER REFERENCES

Publication, "Neon Mickey," May 17, 1956.